United States Patent
Chen et al.

(10) Patent No.: US 7,043,658 B2
(45) Date of Patent: May 9, 2006

(54) PIPELINE MODULE CIRCUIT STRUCTURE WITH REDUCED POWER CONSUMPTION CONTROLLED VIA BI-DIRECTIONAL CLOCK CONTROL BUSES

(75) Inventors: Yung-Huei Chen, Taipei (TW); Hsiang-Chou Huang, Taipei (TW); Chih-Wei Hu, Taipei (TW)

(73) Assignee: Via Technologies, Inc., Taipei (TW)

( * ) Notice: Subject to any disclaimer, the term of this patent is extended or adjusted under 35 U.S.C. 154(b) by 517 days.

(21) Appl. No.: 10/247,471

(22) Filed: Sep. 20, 2002

(65) Prior Publication Data
US 2003/0131271 A1    Jul. 10, 2003

(30) Foreign Application Priority Data
May 1, 2002    (TW) ................................ 91109052 A

(51) Int. Cl.
*G06F 1/04*    (2006.01)
(52) U.S. Cl. ..................... 713/600; 713/322; 713/330
(58) Field of Classification Search ............... 713/322, 713/330, 600
See application file for complete search history.

(56) References Cited

U.S. PATENT DOCUMENTS

| | | | |
|---|---|---|---|
| 5,740,087 A * | 4/1998 | Smentek et al. | 713/321 |
| 6,611,920 B1 * | 8/2003 | Fletcher et al. | 713/322 |
| 2002/0175839 A1 * | 11/2002 | Frey | 341/50 |

* cited by examiner

*Primary Examiner*—Lynne H. Browne
*Assistant Examiner*—Tse Chen
(74) *Attorney, Agent, or Firm*—Rosenberg, Klein & Lee

(57) ABSTRACT

A pipeline module circuit structure with reduced power consumption and a method for operating the pipeline module circuit structure are provided. The pipeline module circuit structure comprises a plurality of pipeline stages and a clock generator, each of the pipeline stages connected to adjacent pipeline stages through a bus. A clock controller is installed in each of the pipeline stages, so as to set the clock frequency of a preceding pipeline stage to an idle frequency or stop when a present pipeline stage starts to operate and to set the clock frequency of a next pipeline stage to an operation frequency when the present pipeline stage is about to cease, such that the power consumption of the pipeline module circuit structure is effectively reduced.

12 Claims, 4 Drawing Sheets

US 7,043,658 B2

PIPELINE MODULE CIRCUIT STRUCTURE WITH REDUCED POWER CONSUMPTION CONTROLLED VIA BI-DIRECTIONAL CLOCK CONTROL BUSES

BACKGROUND OF THE INVENTION

1. Field of the Invention

The present invention generally relates to a pipeline module circuit structure and a method for operating the same and, more particularly, to a pipeline module circuit structure with reduced power consumption and a method for operating the pipeline module circuit structure. The pipeline module circuit structure is characterized in that a clock controller is installed in the logic circuit of each pipeline stages so as to set the clock frequency of a preceding stage to a idle frequency or stop when a present stage starts to operate and to set the clock frequency of a next stage to an operation frequency when the present stage is about to cease, such that the power consumption of the pipeline module circuit structure is effectively reduced.

2. Description of the Prior Art

In recent years, with the high development in electronic- and information-related industries, people have increasing needs for better performance of various electronic and information products. On the other hand, energy conservation has become an important issue because people have realized that there are limited and fewer resources on this planet earth. In view of this, the industries have made lots of efforts to develop various new products with not only good performance but also low power consumption. On the other hand, for a portable electronic product such as a notebook computer for example, the more power consumption of the product is reduced, the longer it operates after the battery mounted is charged.

Please refer to FIG. 1, which is a block diagram schematically illustrating a conventional computer system in accordance with the prior art. In FIG. 1, the computer system comprises an input device 11, a central processing unit (CPU) 13, a power management unit (PMU) 15, a system controller 17 and a plurality of device systems 19. In order to minimize the power consumption, the computer system is provided with various energy conservation modes. When the operating system learns that the idle level and/or the idle time has reached a pre-determined value, the operating system will have the power management unit 15 send an interrupt or a supply command to the device system controller 17 and the central processing unit 13 so as to operate in a power conservation mode.

When a user is to operate a certain device, the input device 11 (such as a mouse or a keyboard) is employed to send some commands corresponding to the system device 19 through software. If the computer has reached a deep level of energy conservation mode and cannot execute the commands, the computer system can be rebooted to proceed with the commands.

The fore-mentioned measure for power conservation can only succeed in minor achievements, because it can only interrupt or supply the power to the entire system. In this case, the entire system will be in a high power consumption state even though only part of the system is activated. In other words, meaningless waste of energy cannot be avoided if the whole system cannot be divided for power conservation.

Therefore, there is need in providing a pipeline module circuit structure with reduced power consumption and a method for operating the pipeline module circuit structure, in which the system can operate with reduced power consumption without sacrificing the efficiency.

SUMMARY OF THE INVENTION

Accordingly, it is the object of the present invention to provide a pipeline module circuit structure with reduced power consumption and a method for operating the pipeline module circuit structure, in which a preceding pipeline stage and a next pipeline stage are kept in a power conservation state when only a present pipeline stage is in operation, so as to effectively reduce the power consumption.

It is another object of the present invention to provide a pipeline module circuit structure with reduced power consumption and a method for operating the pipeline module circuit structure, in which the clock frequency is controlled to be in an operation frequency, a idle frequency or stop (zero) according to the operation status of each pipeline stage, so as to effectively reduce the power consumption.

It is still another object of the present invention to provide a pipeline module circuit structure with reduced power consumption, in which a clock controller is installed in each of the pipeline stages to regulate the clock frequency of each pipeline stage.

It is still another object of the present invention to provide a pipeline module circuit structure with reduced power consumption and a method for operating the pipeline module circuit structure, in which a clock control bus is installed between two adjacent pipeline stages to deliver a control signal to a preceding stage to have the clock frequency thereof reduced even to zero (stop) when a present stage starts to operate, so as to effectively reduce the power consumption.

It is still another object of the present invention to provide a pipeline module circuit structure with reduced power consumption and a method for operating the pipeline module circuit structure, in which a clock control bus is installed between two adjacent pipeline stages to deliver a control signal to a next stage to have the clock frequency thereof adjusted to an operation frequency when a present stage is about to finish job.

In order to achieve the foregoing objects, the present invention provides a pipeline module circuit structure with reduced power consumption, comprising: a plurality of pipeline stages, each connected to adjacent pipeline stages through a bus; a clock generator, connected to the plurality of pipeline stages for providing clock signals to active each of said pipeline stages; and a plurality of clock controllers, each installed in a corresponding pipeline stage for receiving a clock signal from the clock generator and to control the clock frequency of the corresponding pipeline stage according to the operation status of the corresponding pipeline stage.

The present invention further provides a method for operating a pipeline module circuit structure with reduced power consumption, comprising steps of: transmitting a clock control signal to the clock controller of a preceding pipeline stage to regulate the clock frequency of the preceding pipeline stage when a present pipeline stage starts to operate; and transmitting a clock control signal to the clock controller of a next pipeline stage to regulate the clock frequency of the next pipeline stage to be an operation frequency when the present pipeline stage is about to finish job.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing a pipeline module circuit structure with reduced power consumption and a method for operating the pipeline module circuit structure can be exemplified by the preferred embodiment as described hereinafter.

Due to the high development in electronic and information industries as well as the increasing needs for better performance of various electronic and information products, most of the IC's are designed to employ a pipeline structure so as to increase the efficiency. Conventional operation for an electronic system such as a computer is performed in proper sequence, where the commands such as fetch, decode, execute and store are executed in sequence. However, plenty of time may be wasted because a command can not be executed until a preceding one is completed.

Figure 1:
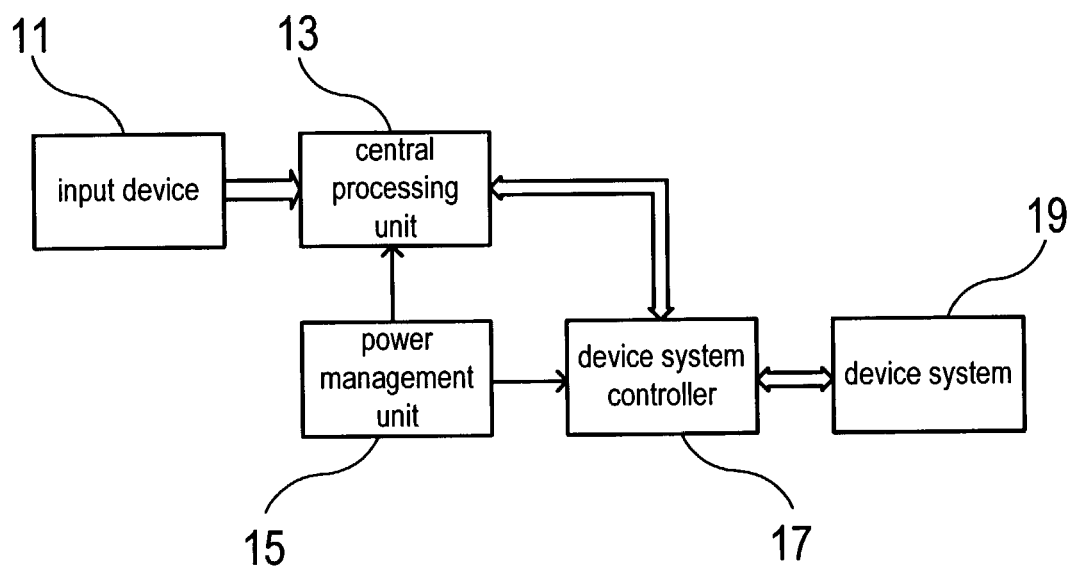
FIG. 1 is a block diagram schematically illustrating a conventional computer system in accordance with the prior art.
Figure 2:
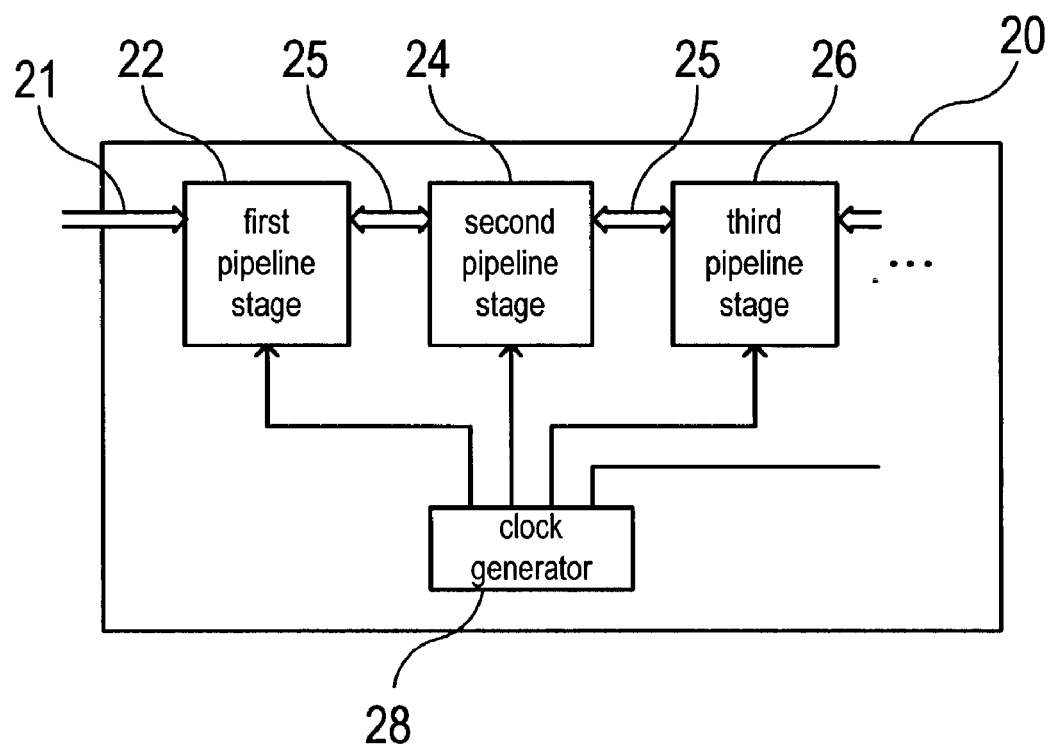
FIG. 2 is a block diagram schematically illustrating a conventional pipeline module circuit structure in accordance with the prior art.

Nowadays, with the use of a pipeline technology, a command can be pre-fetched even when a preceding one is still being executed. A plurality of commands can be executed in the same period of time, thereby reducing the waste of time. FIG. 2 is a block diagram schematically illustrating a conventional circuit with pipeline structure in accordance with the prior art.

In FIG. 2, the IC module 20 comprises a plurality of pipeline stages. More particularly, the first pipeline stage 22 is the preceding one for the second pipeline stage 24, while the third pipeline stage 26 is the next one for the second pipeline stage 24. A data and control bus 25 is interposed between adjacent pipeline stages such that each pipeline stage is connected to a preceding pipeline stage and a next pipeline stage through the bus 25. A clock generator 28 is connected to each of the pipeline stages through signal lines so as to provide clock signals for the operation of the pipeline stages.

When a data or control signal is transmitted from an external bus 21 to the first pipeline stage 22, the first pipeline stage 22 starts to perform operation and then transmits the result to the second pipeline stage 24 for further operation. Similarly, the second pipeline stage 24 transmits the result to the third pipeline stage 26 for further operation, and so forth. After the first pipeline stage 22 has transmitted the result to the second pipeline stage 24 for further operation, the first pipeline stage 22 can receive a next command for operation.

Figure 3:
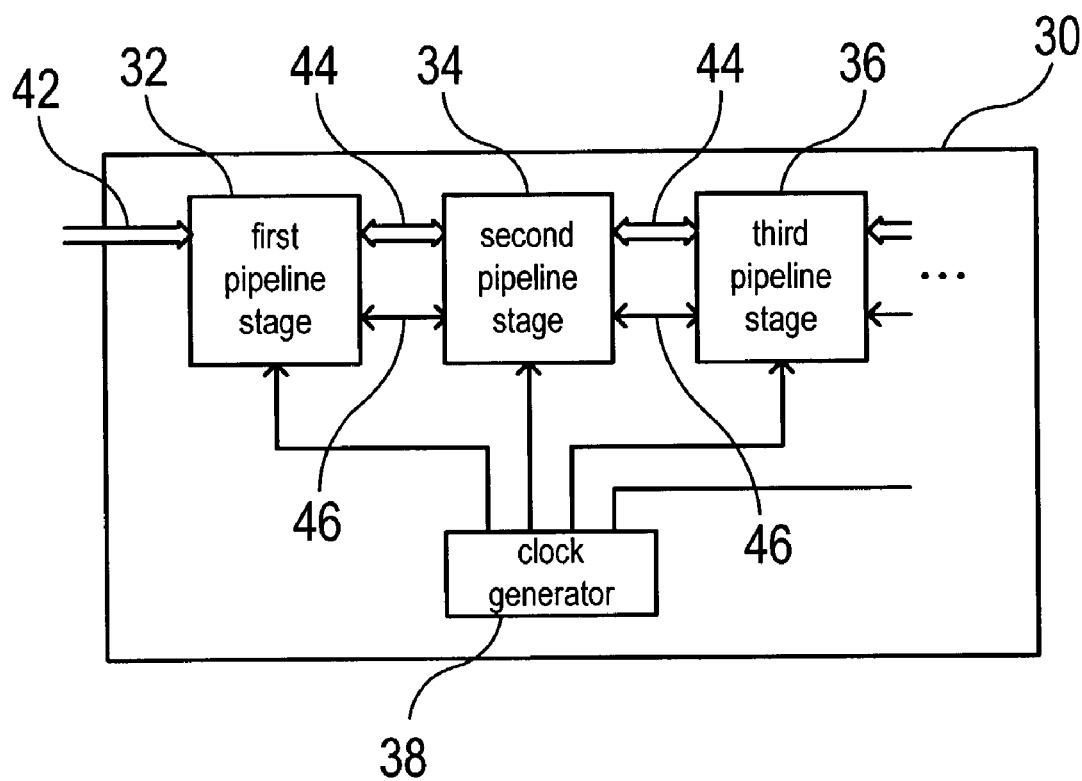
FIG. 3 is a block diagram schematically illustrating a pipeline module circuit structure in accordance with one preferred embodiment of the present invention.
Figure 4:
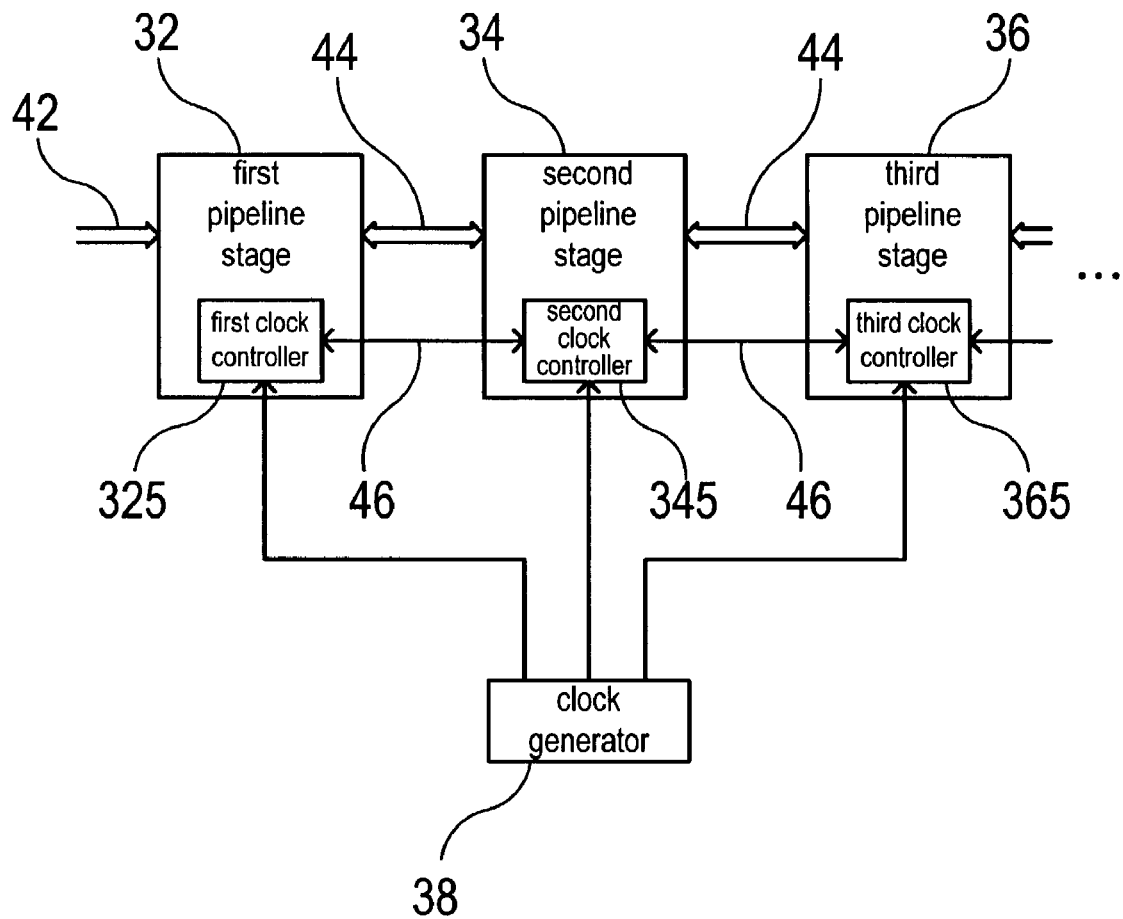
FIG. 4 is a detailed block diagram schematically illustrating the pipeline module circuit structure of FIG. 3.

Please refer to FIG. 3 and FIG. 4, which show, respectively, a block diagram and a detailed block diagram schematically illustrating a pipeline module circuit structure in accordance with one preferred embodiment of the present invention. In the figures, the IC module 30 comprises a plurality of pipeline stages. In addition, a clock controller 325, 345, 365 is installed in each of the pipeline stages 32, 34, 36, respectively. Each of the clock controllers 325, 345, 365 is connected to a clock generator 38 through a signal line, so as to receive clock signals from the clock generator 38 and adjust the clock frequency according to the operation status of the corresponding pipeline stage. In addition to the data and control bus 44 for transmitting data and control signals between the pipeline stages, a clock control bus 46 can be employed to transmit clock control signals between the clock controllers.

When a data or control signal is transmitted form an external bus 42 to the first pipeline stage 32, the first pipeline stage 32 starts to perform operation. When the operation is almost completed, the clock controller 325 transmits an activating clock control signal through the clock control bus 46 to the clock controller 345 in the second pipeline stage 34. Then the clock controller 345 adjusts the clock frequency of the second pipeline stage 34 to an operation frequency such that the second pipeline stage 34 is prepared to operate. The first pipeline stage 32 transmits the result through the data and control bus 44 to the second pipeline stage 34 for further operation after the operation in the first pipeline stage 32 is completed.

The second pipeline stage 34 starts to operate after it has received the operation result from the first pipeline stage 32. Meanwhile, the clock controller 345 in the second pipeline stage 34 transmits an idle clock control signal to the clock controller 325 in the first pipeline stage 32. The clock frequency of the first pipeline stage 32 is reduced to an idle frequency or zero (stop) by the clock controller 325.

Similarly, when the operation in the second pipeline stage 34 is almost completed, the clock controller 345 transmits an activating clock control signal through the clock control bus 46 to the clock controller 365 in the third pipeline stage 36. Therefore, the clock frequency of the third pipeline stage 36 is adjusted to an operation frequency such that the third pipeline stage 36 is prepared to receive the operation result from the second pipeline stage 34 and starts to operate.

The clock controller according to the present invention can be implemented by using a switching element or a frequency divider according to the corresponding pipeline stage. A switching element can be used when the clock frequency for a pipeline stage can be zero (stop) such that the input clock frequency from the clock generator is reduced to zero (stop) when the pipeline stage is idled. On the other hand, a frequency divider can be used when the clock frequency for a pipeline stage cannot be zero (stop) such that the input clock frequency from the clock generator is reduced to an idle frequency by the frequency divider when the pipeline stage is idled. Moreover, the clock control bus for connecting the clock controllers can be implemented by using a signal line so as to transmit clock control signals.

The pipeline module circuit structure and the method according to the present invention can be used in IC's such that the pipeline stages that have to operate can operate normally at an operation frequency and the pipeline stages that do not have to operate for the time being can have their clock frequency become zero (stop) or an idle frequency. Therefore, by controlling the clock frequency in the pipeline stage, the on-and-off switching of the elements thereof is greatly reduced while the stage is idled, then the whole system can operate with minimized power consumption without affecting the efficiency.

According to the above discussion, it is apparent that the present invention discloses a pipeline module circuit structure with reduced power consumption and a method for operating the pipeline module circuit structure. The pipeline module circuit structure is characterized in that a clock controller is installed in each of the pipeline stages so as to set the clock frequency of a preceding pipeline stage to an idle frequency or zero (stop) when a present pipeline stage starts to operate and to set the clock frequency of a next pipeline stage to an operation frequency when the present pipeline stage is about to cease, such that the power consumption of the pipeline module circuit structure is effectively reduced. Therefore, the present invention has been examined to be progressive, advantageous and applicable to the industry.

Although this invention has been disclosed and illustrated with reference to a particular embodiment, the principles involved are susceptible for use in numerous other embodiments that will be apparent to persons skilled in the art. This invention is, therefore, to be limited only as indicated by the scope of the appended claims.

The invention claimed is:

1. A pipeline module circuit structure with reduced power consumption, comprising:
    a plurality of pipeline stages, each connected to adjacent pipeline stages through a bus;
    a clock generator connected to each of said pipeline stages for providing clock signals to activate each of said pipeline stages;
    a plurality of clock controllers, each installed in a corresponding pipeline stage for receiving a clock signal from said clock generator and controlling a clock frequency of said corresponding pipeline stage according to an operation status of said corresponding pipeline stage; and
    a plurality of bi-directional clock buses respectively interposed between clock controllers of adjacent pipeline stages for transmission of an activation clock control signal to a following adjacent pipeline stage and a clock control signal to a preceding adjacent pipeline stage for reducing power consumption thereof.

2. The pipeline module circuit structure as claimed in claim 1, wherein each of said clock controllers includes means for generating said activation clock control signal responsive to said corresponding pipeline stage approaching completion of a data processing operation thereof.

3. The pipeline module circuit structure as claimed in claim 1, wherein the operation status of each of said pipeline stage includes normal operation and idle state.

4. The pipeline module circuit structure as claimed in claim 1, wherein the clock frequency of each of said pipeline stages includes an operation frequency, an idle frequency and stop.

5. The pipeline module circuit structure as claimed in claim 1, wherein said clock controller comprises a frequency divider.

6. The pipeline module circuit structure as claimed in claim 1, wherein said clock controller comprises a switching element.

7. The pipeline module circuit structure as claimed in claim 1, wherein said bus is one selected from a data bus, a control bus, and a combination thereof.

8. A pipeline module circuit structure with reduced power consumption, comprising:
    a plurality of pipeline stages, each connected to adjacent pipeline stages through a bus;
    a clock generator connected to each of said pipeline stage for providing clock signals to activate each of said pipeline stages; and
    a plurality of bi-directional clock control buses respectively interposed between adjacent pipeline stages for transmitting clock control signals therebetween to activate a following adjacent pipeline stage and to idle a preceding adjacent pipeline stage.

9. The pipeline module circuit structure as claimed in claim 8, further comprising a clock controller installed in each of said pipeline stages for receiving a clock signal from said clock generator and controlling a clock frequency of a corresponding pipeline stage according to an operation status of said corresponding pipeline stage each clock controller being coupled to a respective one of said plurality of bi-directional clock control buses extending to a corresponding adjacent pipeline stage.

10. The pipeline module circuit structure as claimed in claim 8, wherein said bus is one selected from a data bus, a control bus, and a combination thereof.

11. The pipeline module circuit structure as claimed in claim 9, wherein said clock controller comprises a switching element.

12. The pipeline module circuit structure as claimed in claim 9, wherein said clock controller comprises a frequency divider.

* * * * *